United States Patent
Wundlechner et al.

(10) Patent No.: US 12,203,217 B2
(45) Date of Patent: Jan. 21, 2025

(54) EMULSION FROM THE OXIDATION PRODUCTS OF NATURAL WAXES, HAVING IMPROVED BARRIER PROPERTIES

(71) Applicant: Clariant International Ltd, Muttenz (CH)

(72) Inventors: Milena Wundlechner, Mertingen (DE); Simon Bodendorfer, Augsburg (DE); Halil Can Aran, Munich (DE); Daniela True, Untermeitingen (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 18/705,700

(22) PCT Filed: Nov. 11, 2022

(86) PCT No.: PCT/EP2022/081569
§ 371 (c)(1),
(2) Date: Apr. 29, 2024

(87) PCT Pub. No.: WO2023/088794
PCT Pub. Date: May 25, 2023

(65) Prior Publication Data
US 2024/0328090 A1    Oct. 3, 2024

(30) Foreign Application Priority Data
Nov. 19, 2021 (EP) .................... 21209400

(51) Int. Cl.
*D21H 19/18* (2006.01)
(52) U.S. Cl.
CPC .................. *D21H 19/18* (2013.01)

(58) Field of Classification Search
CPC ....................................................... D21H 19/18
See application file for complete search history.

(56) References Cited

U.S. PATENT DOCUMENTS

| | | | | |
|---|---|---|---|---|
| 4,064,149 A | * | 12/1977 | Rieger | B41M 5/10 106/31.63 |
| 2007/0068642 A1 | | 3/2007 | Borsinger | |
| 2022/0235274 A1 | * | 7/2022 | Hayes | C09D 7/61 |

FOREIGN PATENT DOCUMENTS

| | | |
|---|---|---|
| DE | 102014001709 A1 | 8/2015 |
| EP | 3808819 A1 | 4/2021 |
| WO | 2006137274 A1 | 12/2006 |
| WO | 2007061592 A1 | 5/2007 |
| WO | 2014060082 A1 | 4/2014 |
| WO | 2019204830 A1 | 10/2019 |

OTHER PUBLICATIONS

Goslinska, Monika, and Stefan Heinrich. "Characterization of waxes as possible coating material for organic aerogels." Powder technology 357 (2019): 223-231.

* cited by examiner

*Primary Examiner* — Emmanuel S Luk
*Assistant Examiner* — Stephen M Russell

(57) ABSTRACT

The invention relates to an emulsion from the oxidation products of natural waxes, having improved barrier properties, to a process of producing such an emulsion, and to cellulose fiber articles or biopolymers coated with such an emulsion from the oxidation products of natural waxes. The invention further relates to the use of such an emulsion for coating substrates that contain cellulose fibers or biopolymers.

16 Claims, 1 Drawing Sheet

Figure 1: Cobb values versus Algro-Finess and Köhler of the coated substrates
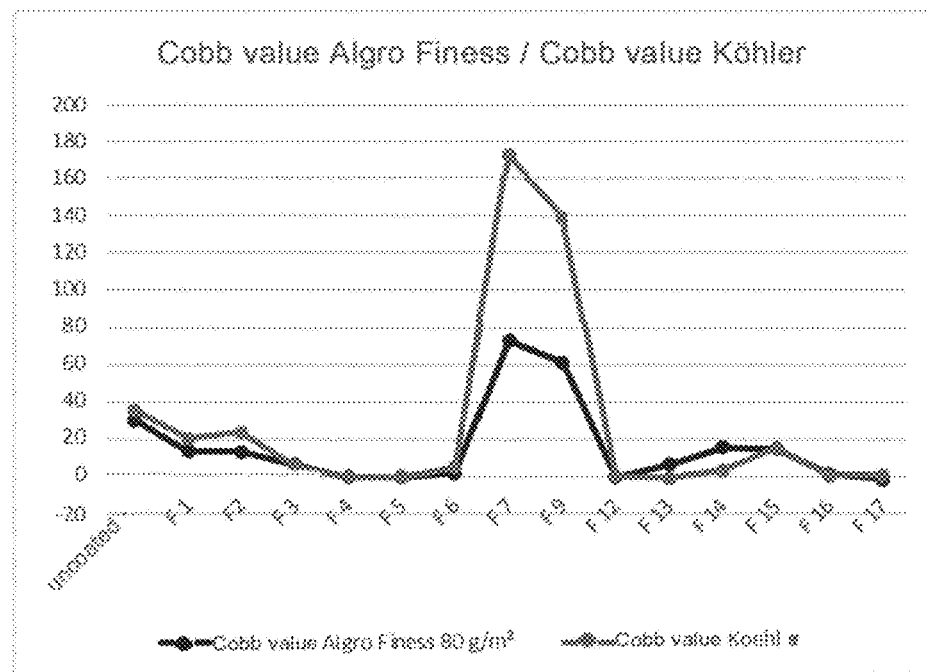
Figure 2: Water vapor transmission rate (WVTR) Q100 of the respective barrier layer
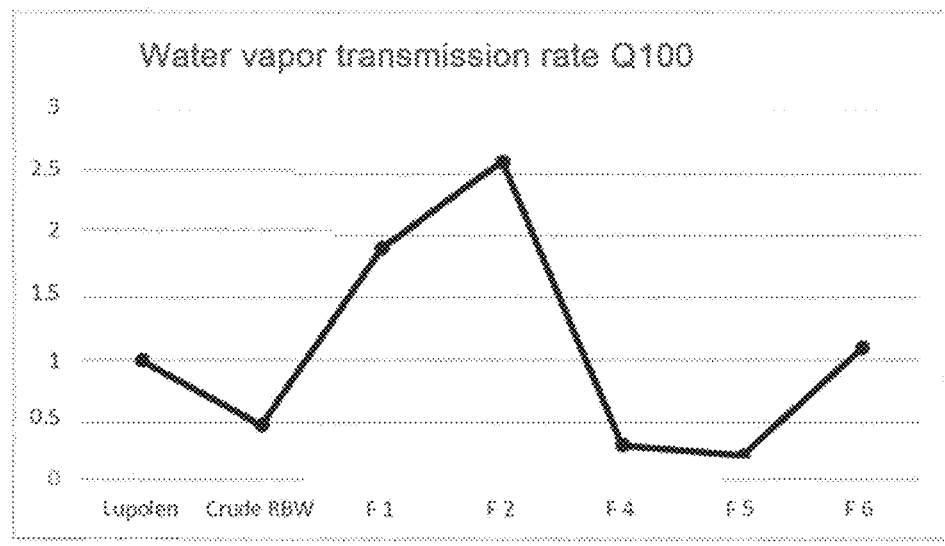

EMULSION FROM THE OXIDATION PRODUCTS OF NATURAL WAXES, HAVING IMPROVED BARRIER PROPERTIES

TECHNICAL FIELD OF THE INVENTION

The invention relates to a natural wax oxidate emulsion for the formation of a water (vapor) barrier layer having improved barrier properties, to a process for producing such an emulsion, and to articles made of cellulose fibers or biopolymers that have been coated with such a natural wax oxidate emulsion. The invention further relates to the use of such an emulsion for coating of substrates containing cellulose fibers or biopolymers.

BACKGROUND OF THE INVENTION

In the foods and consumer goods industries and for industrial products, a wide variety of different types of packaging material is required. With regard to the packaging of moisture-sensitive or water-containing goods, it is necessary to protect the packaging from becoming soaked through. For this purpose, either water-impervious films or coated cellulosic substrates, for example coated paper or coated cardboard, are used.

Suitable coating materials for the cellulosic substrates are thin impervious polymer layers or water-repellent waxy coatings. Another factor here is the interaction of the coating and the object to be packaged. Thus, for food and drink packaging, preference should be given to using packaging materials that do not contain any substances of potential concern to health, for example MOSH/MOAH from mineral oil fractions, phthalates and other plasticizers. For that reason, coatings of natural, renewable waxes are particularly suitable and have already been described many times in the literature.

For instance, EP3781485 describes a composition for impregnation of paper and cardboard that contains a plant wax, for example sugarcane wax and/or rice bran wax. The composition is formed into pellets containing sugarcane wax and/or rice bran wax and can be applied as a barrier layer with corresponding machines. It has been found that both sugarcane wax and rice bran wax, when they have been applied to paper alone, adhere at first but become detached from the paper substrate after prolonged contact with hot water. In addition, it has been observed that a water-resistant layer consisting of a mixture of sugarcane wax and rice bran wax adheres over prolonged periods and remains water resistant when exposed to hot water.

Heinrich et al., in Powder Technology 357 (2019) 223-231, described the water vapor barrier properties of beeswax, candelilla wax, rice wax and sunflower wax. Rice wax shows the highest water vapor permeability here of all the waxes examined, and hence the worst barrier properties.

WO2006137274 describes a polymer composition comprising a rice bran wax which is suitable for production of biodegradable thin-layer barriers and laminates comprising them. The coating composition is anhydrous.

What is common to the natural wax-containing barrier coatings described is that they are applied from the melt and hence require special apparatuses for the coating operations. Furthermore, the coating requires the input of thermal energy to convert the compositions to the melt, which makes the application of the barrier layer energy-intensive.

WO2007/061592 describes a composition for use in the production of edible, biodegradable containers that comprises water, pregelatinized and native starch and a wax emulsion inter alia, wherein the composition consists essentially of materials in food quality.

The preferred wax emulsion is a stable aqueous emulsion that normally consists of carnauba wax, candelilla wax, rice bran wax, paraffin wax or another foodgrade wax. The waxes used are bleached waxes that have not undergone further oxidation, i.e. the acid number of the bleached wax corresponds very substantially to that of the raw wax. The emulsion is produced with the aid of emulsifiers. Preferred examples of wax emulsions that are suitable for use in the formulation known from WO2007/061592 are emulsified carnauba wax and emulsified candelilla wax. Emulsifiers mentioned are all emulsifiers approved for food applications, especially sorbitan monostearate, Polysorbate 60, Polysorbate 65, Polysorbate 80, foodgrade gums (e.g. arabinogalactan, carrageenan, furcelleran, xanthan), stearyl monoglyceridyl citrate, succistearin and hydroxylated lecithin.

The wax emulsion is said to increase the water resistance of the composition, but does not serve to form a barrier layer.

DE102014001709A discloses an aqueous natural wax oxidate emulsion with a cationic emulsifier. However, the document does not disclose an aqueous natural wax oxidate emulsion with an anionic or a nonionic emulsifier.

Document US2007068642A1 discloses wax-containing emulsions for coating of paper substrates or fruits. The waxes described are "palm wax" and "soya wax", which are partly and fully hydrogenated oils that are obtained by hydrogenation of the triglycerides that form soya oil and palm oil. In this way, a palm or soya wax is obtained by reduction. This reduces the double bonds of the unsaturated fatty acids. Thus, "palm and soya wax" are chemically entirely different substances than natural wax oxidates, which are produced from genuine natural waxes and hence from usually monovalent esters of long-chain fatty acids.

There is a continuing need for natural wax-containing coatings that can be applied to a polysaccharide substrate without heat input and form a barrier layer against water and water vapor. Furthermore, such natural wax-containing coatings are also suitable for water (vapor)-permeable polymer substrates and may find use on water (vapor)-permeable plastic films, for example biopolymer films, especially polylactide (PLA) films. The barrier layer should as far as possible require no addition of polymers or film formers, show good adhesion on the substrate, be applicable in a thin layer and have sufficient flexibility to not become brittle or porous, since this would adversely affect the barrier properties.

SUBJECT MATTER OF THE INVENTION

It has been found that, surprisingly, this object is achieved by an aqueous natural wax oxidate emulsion comprising (a) at least one natural wax oxidate having a ratio of acid number to OH number of not less than 1 and (b) at least one anionic or nonionic emulsifier.

Such an emulsion is stable and can thus be applied without difficulty to a polysaccharide- or biopolymer-containing substrate, preferably to a cellulosic substrate, and forms a correspondingly adhering homogeneous layer thereon.

Emulsifiers refer to auxiliaries for production and stabilization of emulsions that serve to blend and stabilize two mutually immiscible liquids, for example oil and water, to give a finely divided mixture, called the emulsion. The situation is similar for the mixing-up of solid, insoluble substances in a liquid to form what is called a suspension.

This property is possessed by molecules having phase-mediating properties, for example surfactants. Surfactants simultaneously contain a hydrophobic and a hydrophilic molecular moiety, and hence are capable of forming micelles around finely divided droplets or particles (e.g. wax particles) and of stabilizing them in the dispersion medium (e.g. water) against agglomeration and settling. A distinction is made here between nonionic surfactants and ionic surfactants. The former include partial charges, whereas the polar molecular moiety in the case of ionic surfactants is represented by an ion. Accordingly, there are anionic, cationic and amphoteric ionic surfactants.

Suitable natural wax oxidates can be emulsified in water by emulsifying them with water and a specifically matched emulsifier system while stirring at temperatures above the melting point of the wax, and the emulsion thus formed can then be cooled while stirring. The wax suspension thus created is referred to in the industrial jargon as "wax emulsion".

It is possible here to use nonionic or ionic emulsifier systems or a combination of the two. Ionic emulsifiers may also be created in situ by hydrolyzing wax acids or oil acids, for example, with alkaline media or amines.

Suitable emulsifiers in natural wax oxidate emulsions are especially anionic and nonionic emulsifiers, for example Genapol® or Hostapur® emulsifiers from Clariant International Ltd.

The present invention further provides a process for producing such an emulsion and to the use thereof for production of coated polysaccharide- or biopolymer-containing substrates.

Application from an aqueous emulsion is advantageous since it need not be heated for application and it is possible to apply a thinner and hence more flexible layer. This makes this process more energetically favorable compared to the prior art coating methods, brings benefits with regard to the use of resources, and facilitates paper recycling. The layer applied from the emulsion has very low water vapor permeability and leads to a distinctly lowered water absorption of the otherwise hydrophilic substrate. Moreover, the layer is very homogeneous and nonporous, which also leads to a good barrier effect.

DETAILED DESCRIPTION OF THE INVENTION

Production of the natural wax oxidate in the natural wax oxidate-containing emulsion can be accomplished, for example, by employing any of the known oxidation methods that also oxidize the natural wax itself and hence increase the acid number of the natural wax oxidate, measured to ISO 3681, by at least 5 mg KOH/g, preferably at least 10 mg KOH/g, by comparison with the starting material (generally the natural wax or a bleached form of the natural wax) and do not just lead to bleaching of the wax by oxidation of the impurities in the wax. These include oxidation with chromic acid, with chromosulfuric acid (chromium trioxide and sulfuric acid) and with dichromate salts, thermal oxidation with oxygen, which can also be carried out with the aid of a catalyst, and all kinds of electrochemical oxidation.

Suitable natural wax oxidates are especially those that are produced by oxidation from genuine natural waxes. Genuine natural waxes are understood to mean those natural waxes that are already in wax form in the raw material source and need not be subjected to further chemical conversion to be regarded as a wax.

Preference is given to natural waxes that are formed from monovalent esters of long-chain fatty acids.

Particular preference is given to oxidates of rice bran wax, of corn wax, of sugarcane wax, of sunflower wax and of carnauba wax. Particular preference is given to oxidates of rice bran wax and corn wax. Very particular preference is given to rice bran wax oxidate.

The natural wax oxidates preferably have an acid number, measured to ISO 2114, between 1 and 140 mg KOH/g, preferably between 15 and 140 mg KOH/g, more preferably between 30 and 140 mg KOH/g. Very particular preference is given to acid numbers between 15 and 110 mg KOH/g or between 30 and 110 mg KOH/g. These acid number ranges are achieved by the oxidation alone and do not require a further esterification step. Such natural wax oxidates on the one hand have sufficient polarity to be more easily emulsifiable in water, but on the other hand are not yet so polar that the barrier layer has defects attributable to polarity in the microstructure of the barrier layer that adversely affect the barrier effect.

In a preferred embodiment, the at least one natural wax oxidate in the emulsion of the invention has a saponification value between 30 and 200 mg KOH/g, preferably between 50 and 180 mg KOH/g, more preferably between 80 and 170 mg KOH/g, measured to ISO 3681. Very particular preference is given to saponification values between 80 and 140 mg KOH/g.

The at least one natural wax oxidate in the emulsion of the invention preferably has a hydroxyl number, measured to DGF M-IV 6, of less than 8 mg KOH/g, preferably less than 5 mg KOH/g, which represents more homogeneous material properties and hence leads to formation of a more homogeneous barrier layer with fewer defects in the microstructure.

In a preferred embodiment, the natural wax oxidate has an iodine color number of less than 20, preferably less than 15 and more preferably less than 10, measured to DIN 6162. A low iodine color number indicates a particularly light color of the wax, and the wax thus does not have an adverse effect on the color of the substrate.

The at least one natural wax oxidate in the emulsion of the invention preferably has a dropping point between 65 and 110° C., measured to ISO 2176. This means that the resulting coating has good thermal stability without having to expend too much energy in the production of the natural wax emulsion in order to cause the natural wax to melt.

In order to assure easy applicability of the aqueous natural wax emulsion and to make the barrier layer as thin and homogeneous as possible, the natural wax oxidate is present in the emulsion to an extent of 5% to 50% by weight, preferably to an extent of 10% to 45% by weight, more preferably to an extent of 15% to 40% by weight, most preferably to an extent of 20% to 35% by weight, based on the total mass of the emulsion.

In a preferred embodiment, the at least one emulsifier is an anionic or nonionic emulsifier. Hydrophobic waxes can be emulsified particularly easily with the aid of anionic or nonionic emulsifiers.

Anionic emulsifiers have an ammoniacal odor that might cause the user to feel unwell. This can be avoided when nonionic emulsifiers are used, preferably surfactants. In addition, anionic emulsifiers have a relatively high pH, which has an unfavorable effect in some applications. Thus, nonionic emulsifiers are preferred for some applications, for example pH-sensitive products or cosmetic products.

The nature of the nonionic emulsifier can be described by the mass ratio between the polar and the nonpolar portion of a surfactant and is defined via the HLB value ("hydrophilic-lipophilic balance", the hydrophilic-lipophilic ratio of the molecule). The level of this hydrophilic-lipophilic ratio can be determined by calculation of values for the different regions of the molecule, as described by Griffin (cf., for example, Journal of the Society of Cosmetic Chemists, 5 (4), 249-256 (1954)). The Griffin method was developed primarily for nonionic surfactants; the HLB value is calculated by the following formula:

$$HLB=10*Mh/M$$

where Mh is the molecular mass of the hydrophilic part of the molecule and M is the molecular mass of the overall molecule, which results in a value on a scale from 0 to 20.

An HLB value of 0 corresponds to a completely lipophilic molecule; an HLB value of 20 corresponds to a completely hydrophilic molecule.

Surfactants having a low HLB value have good fat-dissolving properties; a high HLB value results in good wetting of hydrophilic surfaces. On the basis of different HLB values, it is possible to form stable emulsions in O/W to W/O systems.

An oil-in-water emulsifier (O/W emulsifier) is understood to mean an emulsifier having an HLB value high enough to give oil-in-water emulsions. The HLB value of such an emulsifier is normally greater than about 8 and is frequently in the range from 8 to 18.

The nonionic emulsifier that stabilizes the natural wax oxidate-in-water emulsion of the invention preferably has an HLB value between 11 and 19, since it is possible to particularly efficiently stabilize a natural wax oxidate emulsion with such a nonionic emulsifier. The HLB value is more preferably between 13 and 18.

The nonionic emulsifier preferably has an EO value (number of ethylene oxide units bonded to the functional group) of greater than 10-80.

The nonionic emulsifiers are preferably fatty alcohol polyglycol ether, alcohol ethoxylate, for example fatty alcohol ethoxylate, and tributylphenol ethoxylate.

In an alternative embodiment, the emulsifier that stabilizes the aqueous natural wax oxidate emulsion is an anionic emulsifier system since such systems surprisingly achieved very good results in the stabilization of the emulsion and the formation, flexibility and stability of the barrier layer, and the barrier layers have very good water stability and water vapor barrier action. This means that these emulsifiers are especially suitable for applications in which high water stability is required, for example in woodcare products.

The anion of an anionic emulsifier system can be obtained by adding a water-soluble or water-dispersible alkali metal hydroxide and/or basic ammonium compound to an organic acid having a straight-chain aliphatic hydrocarbyl radical having 12 to 24 carbon atoms. The anion is supplied as an alkali metal salt, preferably a sodium and/or potassium salt, or a corresponding ammonium or substituted ammonium salt of the corresponding organic acid.

The term "ammonium salt" refers to those neutralization products that are obtained by reaction of surfactant acids in an aqueous medium with ammonia or amines such as volatile bases, e.g. morpholine, methylaminopropanol, diethylaminoethanol (DEAE) etc., or nonvolatile bases, e.g. monoethanolamine, triethanolamine, isopropanolamine, α,ω- and α,γ-substituted diamines such as ethylenediamine, propylene-1,2-diamine, propylene-1,3-diamine, butylene-1, 4-diamine etc. DEAE, owing to its basic characteristics, may form a corresponding salt with an organic acid.

The polar organic group of the salt or acid may be the carboxylate, sulfate or sulfonate ion, and the anion-providing compound may have more than one such polar group.

Examples of suitable organic acids that provide the anion are natural and synthetic aliphatic carboxylic acids having 12 to 24 carbon atoms, e.g. myristic acid, palmitic acid, stearic acid, oleic acid and behenic acid, especially those of the soaps as obtained by cleavage of triglyceride oils, for example tallow fatty acid, which is a mixture of fatty acids consisting mainly of palmitic, stearic and oleic acid.

The anion is preferably one in which there is an alkyl or alkenyl group having 16 to 24 carbon atoms.

Preference is given to using the oleic acid/ammonium hydroxide/KOH emulsifier system.

The amount of the emulsifier used has an effect on the stability of the suspension and the distribution and size of the wax particles. It has been found that particularly thin and homogeneous barrier layers can be formed when the emulsifier is present in the emulsion to an extent of 1-20% by weight, preferably to an extent of 2-15% by weight, based on the total mass of the emulsion.

The invention further provides a process for producing an aqueous natural wax oxidate emulsion, comprising the steps of:

a) providing a natural wax oxidate and an anionic or nonionic emulsifier b) emulsifying the natural wax oxidate with the aid of the emulsifier in water at a temperature above the melting point of the natural wax oxidate, characterized in that the natural wax oxidate has a ratio of acid number to OH number of not less than 1. The natural wax oxidate is producible by the oxidation method described above.

The invention further provides for the use of an aqueous natural wax oxidate emulsion of the invention for coating of a polysaccharide- or biopolymer-containing substrate, preferably a cellulosic substrate with a water vapor barrier layer. Additionally suitable are water vapor barrier layers for water-permeable polymer substrates, for example biopolymer substrates, especially substrates composed of polylactide (PLA).

Accordingly, the invention further provides a polysaccharide- or biopolymer-containing substrate comprising a water vapor barrier layer which is manufactured from an aqueous natural wax oxidate emulsion of the invention.

The polysaccharide- or biopolymer-containing substrate is preferably a cellulosic substrate, more preferably paper or cardboard.

These coated polysaccharide- or biopolymer-containing substrates can be used for any kind of packaging or shell, for example tobacco articles, outer packaging for tobacco articles, paper cups, packaging for frozen articles, outer packaging for bread, sausage and cheese and plants, and cardboard boxes, outer packaging for electronic articles etc.

The invention further provides a process for producing a polysaccharide- or biopolymer-containing substrate, comprising the steps of:

a) applying an aqueous natural wax oxidate emulsion of the invention to the surface of the polysaccharide- or biopolymer-containing substrate;

b) drying the coated substrate to form the barrier layer.

Experimental Part

TABLE 1

Methods of determining the parameters reported

| Parameter | Method |
|---|---|
| Density [g/cm$^3$] | ISO 1183-3 |
| Acid value (AV) [mg KOH/g] | ISO 2114 |
| Saponification value (SV) [mg KOH/g] | ISO 3681 |
| Dropping point (DP) [° C.] | ISO 2176 |
| Needle penetration value (NPV) [mm$^{-1}$] | DIN 51579 |
| Hydroxyl number (OH number) [mg KOH/g] | DGF M-IV 6 |
| Iodine color value (ICV) | DIN 6162 (2014) |
| Thermogravimetric analysis (TGA) [% by wt.] | DIN 51006<br>Heating from 25 to 300° C. at 5K/min, then constant temperature of 300° C. for 30 min. Measurement of loss of mass on attainment of 300° C. and after 30 min at 300° C. |
| Cobb value | DIN EN ISO 535 |
| Renewable Carbon Index | The Renewable Carbon Index (RCI) describes the proportion of carbon atoms from renewable raw materials in an organic compound or mixture and is calculated by the following formula:<br><br>$$RCI(\%) = \frac{\sum_{i=1}^{n}(M_{total} * M_i * BCC_i * 12/MW_i)}{\sum_{i=1}^{n}(M_{total} * M_i * BCC_i * 12/MW_i) + \sum_{i=1}^{n}(M_{total} * M_i * FCC_i * 12/MW_i)}$$<br><br>$M_{total}$ = total mass of the micronized wax additive<br>$M_i$ = mass of the ith component of the micronized wax additive (in %)<br>$BCC_i$ = number of biobased carbon atoms in the ith component of the micronized wax additive<br>$FCC_i$ = number of fossil carbon atoms in the ith component of the micronized wax additive<br>$MW_i$ = molar mass of the ith component of the micronized wax additive<br>Inorganic components and water are not taken into account in the calculation of the RCI. |
| HLB value | The Griffin HLB value (hydrophilic-lipophilic balance) indicates the mass ratio between the polar and nonpolar portion of a surfactant. The Griffin method (1954) was developed primarily for nonionic surfactants, where the HLB value is calculated as follows:<br>$HLB = 10 * Mh/M$<br>where Mh is the molecular mass of the hydrophilic part of the molecule and M is the molecular mass of the overall molecule, which gives a result on a scale from 0 to 20. |

Design of the Examples

TABLE 2

Waxes and wax oxidates used

| | Wax type | Manufacturer | Density | AV | OH number | SV | DP | NPV | ICV | RCI | TGA |
|---|---|---|---|---|---|---|---|---|---|---|---|
| Crude rice bran wax | Natural wax, rice bran wax | Yihai Kerry Arawana Holdings Co. Ltd. | 0.98 | 4 | 8.7 | 81 | 78° C. | 4 | >120 | 100 | n.d. |
| PODAX-BN 5 | Refined rice bran wax | Shanghai Tongs Science & Technology Co. Ltd. | 0.98 | 12.6 | 19 | 88 | 78.9 | 4 | 37 | n.d. | n.d. |
| Licocare RBW 101 | Rice bran wax oxidate | Clariant Ltd. | 0.98 | 19 | 5 | 89 | 78 | 1 | 12 | 100 | 7.44/ 18.35 |

TABLE 2-continued

Waxes and wax oxidates used

| | Wax type | Manufacturer | Density | AV | OH number | SV | DP | NPV | ICV | RCI | TGA |
|---|---|---|---|---|---|---|---|---|---|---|---|
| Licocare RBW 102 | Rice bran wax oxidate | Clariant Ltd. | 0.99 | 52 | 4 | 113 | 77 | 3 | 3 | 100 | 15.49/ 32.03 |
| Licocare RBW 106 | Rice bran wax oxidate | Clariant Ltd. | 1.00 | 128 | 5 | 168 | 76 | 3 | 1 | 100 | — |
| Licowax PED 521 | Oxidized polyethylene | Clariant Ltd. | 0.95 | 17 | — | — | 104 | 4 | — | 0 | 5.1/8.3 |
| Corn wax oxidate 1 | Oxidized corn wax | Clariant Ltd. | 0.98 | 45 | 11 | 104 | 76 | 2 | 1 | 100 | 17.6/41.3 |
| Corn wax oxidate 2 | Oxidized corn wax | Clariant Ltd. | 1.00 | 65 | 2 | 123 | 73 | 3 | 0.7 | 100 | 29.4/55.7 |
| Corn wax oxidate 3 | Oxidized corn wax | Clariant Ltd. | 0.99 | 127 | 1 | 156 | 71 | 3 | 0.3 | 100 | 65.6/ |

Production of Corn Wax Oxidates 1 to 3:

Since the corn wax oxidates are not commercially available products, the experimental conditions for production of the corn wax oxidates are detailed hereinafter:

A 3 l reaction vessel equipped with stirrer, temperature sensor, dropping funnel and reflux condenser was initially charged with the amount of chromium trioxide in sulfuric acid (concentration: 100 g CrO3/l) specified in table 4, and heated to 100° C. Molten (90° C.) natural wax in the raw state was then added a little at a time. The temperature of the reaction mixture was adjusted to 110° C., and the reaction mixture stirred with a precision glass stirrer at approx. 200 rpm for 4 h. The heating and stirring were switched off. As soon as the phases had separated, the aqueous phase was separated off. This operation was conducted twice for production of corn wax oxidates 1 and 2, and five times for production of corn wax oxidate 3, using the amounts specified in table 3.

TABLE 3

Statements of amount for production of the corn wax oxidates used

| Example | 1 | 2 | 3 |
|---|---|---|---|
| Natural wax [g] | 200 | 200 | 200 |
| CrO$_3$/H$_2$SO$_4$ [l] | 2.0 | 2.0 | 1.0 |
| | | | 1.0 |
| | | | 1.0 |
| | 2.0 | 3.4 | 1.0 |
| | | | 1.0 |

The organic phase was freed of chromium residues by washing with an aqueous solution of oxalic acid and sulfuric acid and then by washing with water, drained into warm centrifuge tubes, and centrifuged.

TABLE 4

Emulsifiers used for production of the emulsions

| Emulsifier No. | Chemical classification | Generic description | INCI | HLB value | Emulsifier type |
|---|---|---|---|---|---|
| E 1 | fatty alcohol polyglycol ether | tallow alkyl ethoxylate with 20 EO | Ceteareth-20 | 15.4 | nonionic surfactant |
| E 2 | fatty alcohol polyglycol ether | oleyl ethoxylate with 10 EO | Oleth-10 | 12.6 | nonionic surfactant |
| E 3 | tributylphenol ethoxylate | tri-sec-butylphenol ethoxylate with 50 EO | Dodoxynol-50 | 17.9 | nonionic surfactant |
| E 5 | fatty alcohol polyglycol ether | C12/C15-oxo alcohol ethoxylate with 10 EO | C12-15 Alketh-10 | 13.5 | nonionic surfactant |
| E 6 | fatty alcohol ethoxylate | tallow alkyl ethoxylate with 25 EO | Ceteareth-20 | 16.2 | nonionic surfactant |
| E 7 | fatty acid-based emulsifier system | oleic acid ammonium hydroxide (30%)/KOH | n.a. | n.a. | anionic emulsifier |
| E 8 | | diethylethanolamine (DEAE) | n.a. | n.a. | anionic emulsifier |

A) Production of Various Water-Based Wax Emulsions
A1) Production of Formulations F1, F2, F9, F10 from Table 5 and Formulations F12, F13, F14, F15 from Table 6:

The respective wax and the respective emulsifier were fully melted at 125° C. and stirred to give a homogeneous mass. Boiling distilled water was stirred into the wax melt at 125° C. The resultant emulsion was cooled down while stirring vigorously (about 3 K/min).

A2) Production of Formulation F4 from Table 5:

The wax was fully melted at 125° C., and the DEAE was slowly added dropwise. The melt was stirred for 2 min. The boiling water was stirred into the wax melt at 125° C. The resultant emulsion was cooled down while stirring vigorously (about 3 K/min).

A3) Production of Formulations F3, F5 and F6 from Table 5 and Formulations F16 and F17 from Table 6:

The wax, oleic acid, ammonia solution and KOH were blended with 50% of the required amount of distilled water in a pressure reactor. The blend was heated to 135° C. in the pressure reactor, and the remaining amount of water was added to the mixture at about 125° C. The mixture was stirred at 135° C. for 15 min. The emulsion was then cooled down to 30° C. while stirring (about 3 K/min).

A4) Production of Formulation F7:

The wax and emulsifier E 5 were fully melted at 125° C. and stirred to give a homogeneous mass. The KOH/ethylene glycol mixture was added dropwise while stirring and blended for a further 2 min. The hot wax mixture was then stirred into boiling distilled water. The resultant emulsion was cooled down while stirring vigorously (about 3 K/min).

TABLE 5

Formulations used based on rice bran wax oxidates

| Formulation | F1 (I) | F2 (I) | F3 (I) | F4 (I) | F5 (I) | F6 (I) | F7 (C) | F9 (C) | F10 (C) |
|---|---|---|---|---|---|---|---|---|---|
| PODAX BN-5 | | | | | | | | 10 | 20 |
| Licocare RBW 101 | | 20 | | | | | | | |
| Licocare RBW 102 | 25 | | | | 20 | 20 | | | |
| Licocare RBW 106 | | 25 | | 20 | | | | | |
| Licowax PED 521 | | | | | | | 20 | | |
| Oleic acid | | | 4.0 | | 4 | 7 | | | |
| Ammonium hydroxide | | | 8.0 | | 8.0 | 6.5 | | | |
| KOH (20%) | | | 0.2 | | 0.2 | 0.5 | | | |
| KOH 21.5% in ethylene glycol | | | | | | | 1.6 | | |
| E 1 | 5 | | | | | | | | |
| E 2 | | | | | | | | 2.85 | 5.6 |
| E 3 | | 5 | | | | | | | |
| E 5 | | | | | | | 4.0 | | |
| E 8 | | | | 5.5 | | | | | |
| Dist. water | Make up to 100% with dist. H$_2$O | | | | | | | | |
| Emulsion stability | + | + | + | + | + | + | + | + | − |

TABLE 6

Formulations used based on corn wax oxidates

| | F12 (I) | F13 (I) | F14 (I) | F15 (I) | F16 (I) | F17 (I) |
|---|---|---|---|---|---|---|
| Corn wax oxidate 1 | 25 | | | | 20 | |
| Corn wax oxidate 2 | | 25 | 25 | | | 20 |
| Corn wax oxidate 3 | | | | 25 | | |
| Oleic acid | | | | | 4 | 4 |
| Ammonium hydroxide | | | | | 8 | 8 |
| KOH (20%) | | | | | 0.2 | 0.2 |
| E 1 | 5 | 5 | | | | |
| E 2 | | | | | | |
| E 3 | | | | 5 | | |
| E 6 | | | 5 | | | |
| Dist. water | Make up to 100% with dist. H$_2$O | | | | | |
| Emulsion stability | + | + | + | + | + | + |

The inventive formulations F1-F6 and F12-F17 listed in tables 5 and 6 all form stable emulsions. This is not true of comparative example F10, where no stable emulsion is formed any longer at a wax content of 20%. Comparative example F9 with 10% wax does form a stable emulsion, but the lower wax content is disadvantageous for coating quality and drying time.

B) Production of Coated Paper Substrates with a Wax Emulsion

The wax emulsion detailed in table 7 was applied with a 50 μm coating bar and a test area of 12.5 cm×12.5 cm was cut out and stored at constant temperature of 23% and 30% relative humidity for 24 h. The sample was tared (Tara 1) and clamped in the Cobb aluminum cup.

Then 100 ml of distilled water was added to the sample for 60 s and removed. The residues of water were removed with blotting paper and an absorptive roller, and the weight was determined again (Tara 2). The Cobb value was calculated by the following formula:

$$\text{Cobb value}_{60}s = (\text{Tara 2} - \text{Tara 1}) \times 115.48658$$

The values were determined in triplicate, and the median of the measurements is listed in table 7.

TABLE 7

Cobb$_{60}$ values of the coated paper substrates

| | Cobb$_{60}$ value Algro Finess 80 g/m$^2$ | Cobb$_{60}$ value Koehler |
|---|---|---|
| Uncoated | 30.41 | 35.80 |
| F1 | 13.85 | 20.78 |
| F2 | 13.47 | 23.86 |
| F3 | 6.54 | 5.77 |
| F4 | 0 | 0 |
| F5 | 0 | 0 |
| F6 | 2.31 | 5.00 |
| F7 | 73.1 | 172.8 |
| F9 | 61.59 | 139.35 |
| F12 | 0.00 | 0.38 |
| F13 | 6.54 | −0.38 |
| F14 | 15.78 | 3.46 |
| F15 | 15.01 | 15.4 |
| F16 | 1.54 | 0.77 |
| F17 | −1.15 | 0.77 |

All inventive examples F1-F6 and F12-F17, by comparison with the uncoated paper and comparative examples F7 and F9, show a significant reduction in water absorption, manifested in lower Cobb$_{60}$ values.

C) Production of Coated Carrier Films for Determination of the Barrier Effect of a Wax Coating with the Aid of the Water Vapor Transmission Rate The wax or wax oxidate emulsion or dispersion was coated onto cellophane as a thin film. For this purpose, a semiautomated Sumet Messtechnik CUF 5 coating system was used for processing of substrates in sheet form with a maximum area in DIN A3 format (420×297 mm). The wet application was 50 µm. The application rate was 30 mm/s. The drying temperature was between 70° C. and 90° C. for a drying time of 1-5 min.

In order to eliminate the effects of the substrate, all barrier layers were applied to cellophane, which has a known water vapor permeability. The water vapor transmission rate Q of cellophane film is 1084 g/(m2*d).

The water vapor barrier was determined as water vapor transmission rate Q according to DIN 53122-1 at 23° C. and a moisture gradient of 85% relative humidity on one side of the barrier and 0% on the other side of the barrier. The measured Q value (unit: g/(m2*d)) describes how many grams of water would permeate through an area of one square meter in one day. However, this value depends crucially on the thickness of the wax layer. The thicker the wax layer, the lower the value measured. In order to make various materials of different thickness comparable, therefore, a value normalized to layer thickness 100 µm (Q100 [g*100 µm/(m2*d)]) is reported. This is ascertained by the following formula:

$$\frac{1}{Q(\text{overall})} = \frac{1}{Q(\text{substrate})} + \frac{1}{Q(\text{barrier layer})}$$

In this way, it is possible to calculate the water vapor transmission rates of the respective barrier layer of the measurements listed in table 8 by $$\frac{1}{Q(\text{barrier layer})} = \frac{1}{Q(\text{overall})} + \frac{1}{1084 \text{ g}/(m^2 * d)}.$$

In order to ascertain the water vapor permeability Q100 normalized to layer thickness, the layer thickness of the barrier layer was determined with a microscope with the aid of a microtome section of the coated substrate.

$$Q100 = \frac{Q(\text{barrier layer})}{100} * \text{barrier layer thickness}$$

The reference used is the water vapor transmission rate of Lupolen, the Q100 value of which is 1.

In addition, the water vapor permeability of a thin Crude RBW layer not applied to a cellophane substrate was determined.

The measurements reported in table 8 are an average from 4 measurements performed.

TABLE 8

Water vapor transmission rates of uncoated and coated film substrates (carrier films)

| Sample | Type of emulsion/ coating | Q(overall) (substrate + barrier layer) [g/(m²*d)] | Q (barrier layer) [g/(m²*d)] | Barrier layer thickness [µm] | Q100 of the sample [g*100 µm/(m²*d)] |
|---|---|---|---|---|---|
| Cellophane uncoated | no coating | no wax | | 0 | |
| Lupolen 1800 H | no coating, no cellophane substrate | — | — | 100 | 1.00 |
| Crude rice bran wax | substrate-free barrier layer | 0.202 | 0.2020 | 239 | 0.48 |
| F1 (I) | nonionic | 28.2 ± 2.4 | 28.9 | 6.6 | 1.9 |
| F2 (I) | nonionic | 45.3 ± 2.7 | 47.3 | 5.5 | 2.6 |
| F4 (I) | anionic | 7.36 ± 0.4 | 7.4 | 4.4 | 0.32 |
| F5 (I) | anionic | 6.86 ± 1.1 | 6.9 | 3.3 | 0.23 |
| F6 (I) | anionic | 20.0 ± 4.0 | 20.4 | 5.5 | 1.1 |

All inventive examples show a significant improvement in water vapor permeability over the uncoated cellophane film, which is manifested in lower Q100 values. The Q100 values of the inventive examples are within a comparable range to the Q100 values of the Lupolen 100 reference film, which represents a standard polyethylene-based barrier material.

Crude rice bran wax does show good barrier properties, but is not emulsifiable. Application from the melt requires a higher energy input and is associated with a higher layer thickness compared to aqueous emulsions, which has an adverse effect on material consumption. Higher layer thicknesses additionally have an adverse effect on adhesion and flexibility of the barrier layer.

The invention claimed is:

1. An aqueous natural wax oxidate emulsion for forming a water and/or water vapor barrier layer on a polysaccharide or biopolymer-containing substrate, comprising
    (a) at least one natural wax oxidate having an acid number to hydroxide number ratio of greater than or equal to 1, wherein the natural wax oxidate has a hydroxyl number, measured to DGF M-IV KOH/g, of less than 8 mg KOH/g; and
    (b) at least one anionic or nonionic emulsifier.

2. The aqueous natural wax oxidate emulsion according to claim 1, wherein the natural wax oxidate is preparable by an oxidation process selected from the group consisting of chromic acid oxidation, chromosulfuric acid oxidation (chromium trioxide and sulfuric acid), dichromate salt oxidation, thermal oxidation with atmospheric oxygen and electrochemical oxidation.

3. The aqueous natural wax oxidate emulsion according to claim 1, wherein the natural wax oxidate is selected from the group consisting of rice bran wax oxidate, corn wax oxidate, sugarcane wax oxidate, sunflower wax oxidate, and carnauba wax oxidate.

4. The aqueous natural wax oxidate emulsion according to claim 1, wherein the natural wax oxidate has an acid number between 1 and 140 mg KOH/g, as measured according to ISO 2114.

5. The aqueous natural wax oxidate emulsion according to claim 1, wherein the natural wax oxidate has an iodine color value, measured to DIN 6162, of less than 20.

6. The aqueous natural wax oxidate emulsion according to claim 1, wherein the natural wax oxidate has a dropping point between 65 and 110° C., as measured according to ISO 2176.

7. The aqueous natural wax oxidate emulsion according to claim 1, wherein the natural wax oxidate is present in the emulsion to an extent of 5% to 50% by weight, based on the total mass of the emulsion.

8. The aqueous natural wax oxidate emulsion according to claim 1, wherein the nonionic emulsifier has an HLB value between 11 and 19.

9. The aqueous natural wax oxidate emulsion according to claim 1, wherein the at least one nonionic emulsifier is selected from the group consisting of fatty alcohol polyglycol ether, alcohol ethoxylate, and tributylphenol ethoxylate.

10. The aqueous natural wax oxidate emulsion according to claim 1, wherein the emulsifier is an anionic emulsifier system.

11. The aqueous natural wax oxidate emulsion according to claim 1, wherein the emulsifier is present in the emulsion to an extent of 1-20% by weight, based on the total mass of the emulsion.

12. A process for producing an aqueous natural wax oxidate emulsion according to claim 1, comprising the steps of
   a) providing a natural wax oxidate and an anionic or nonionic emulsifier;
   b) emulsifying the natural wax oxidate with the aid of the emulsifier in water at a temperature above the melting point of the natural wax oxidate, wherein the natural wax oxidate has an acid number to hydroxyl number ratio of greater than or equal to 1, wherein the natural wax oxidate has a hydroxyl number, measured to DGFM-IV 6, or less than 8 mg KOH/g.

13. The process for producing an aqueous natural wax oxidate emulsion according to claim 12, wherein the natural wax oxidate is producible by an oxidation method selected from the group consisting of chromic acid oxidation, chromosulfuric acid oxidation (chromium trioxide and sulfuric acid), dichromate salt oxidation, oxidation with atmospheric oxygen and electrochemical oxidation.

14. A polysaccharide- or biopolymer-containing substrate comprising a water vapor barrier layer formed from the aqueous natural wax oxidate emulsion according to claim 1.

15. The polysaccharide- or biopolymer-containing substrate according to claim 14, wherein the polysaccharide- or biopolymer-containing substrate is a cellulosic substrate.

16. A process for producing a polysaccharide- or biopolymer-containing substrate, comprising the steps of
   a) applying the aqueous natural wax oxidate emulsion according to claim 1 to the surface of the polysaccharide- or biopolymer-containing substrate
   b) drying the coated substrate to form the barrier layer.

* * * * *